UNITED STATES PATENT OFFICE.

WALTER S. MOODY, OF SCHENECTADY, NEW YORK, ASSIGNOR TO GENERAL ELECTRIC COMPANY, A CORPORATION OF NEW YORK.

TRANSFORMER.

SPECIFICATION forming part of Letters Patent No. 713,327, dated November 11, 1902.

Application filed March 27, 1902. Serial No. 100,222. (No model.)

*To all whom it may concern:*

Be it known that I, WALTER S. MOODY, a citizen of the United States, residing at Schenectady, county of Schenectady, State of New York, have invented certain new and useful Improvements in Transformers, (Case No. 2,386,) of which the following is a specification.

My present invention relates to transformers for alternating currents, and is particularly useful in connection with transformers, for multiphase alternating currents, though it is to be understood that its novel features are not necessarily limited to use in this particular relation. In multiphase transformers in which the windings of one phase are located adjacent to windings of another phase or phases, there exists the constant danger that in case of a burn-out caused by a short circuit or similar accident to the windings of one phase the resulting flames may spread from the exposed portions of the damaged winding and by making contact with the undamaged winding thereby cause a destruction of the latter winding along with the winding in which the trouble originated. In case there are more than two windings it will be seen that the trouble may be communicated to all of them and the entire transformer ruined or at least greatly injured. I have found that this difficulty may be overcome by separating the exposed portions of the windings of one phase from the exposed portions of the windings of the other phase or phases, and to effect this separation I make use of barriers which may be cast integral with the main castings of the transformer or may be formed of sheet metal and suitably attached to the structure of the transformer.

The novel features which I believe characterize my invention are pointed out with particularity in the appended claims, while the invention itself is exemplified by an embodiment thereof described in detail in the following specification and illustrated in the accompanying drawings, in which—

Figure 1:
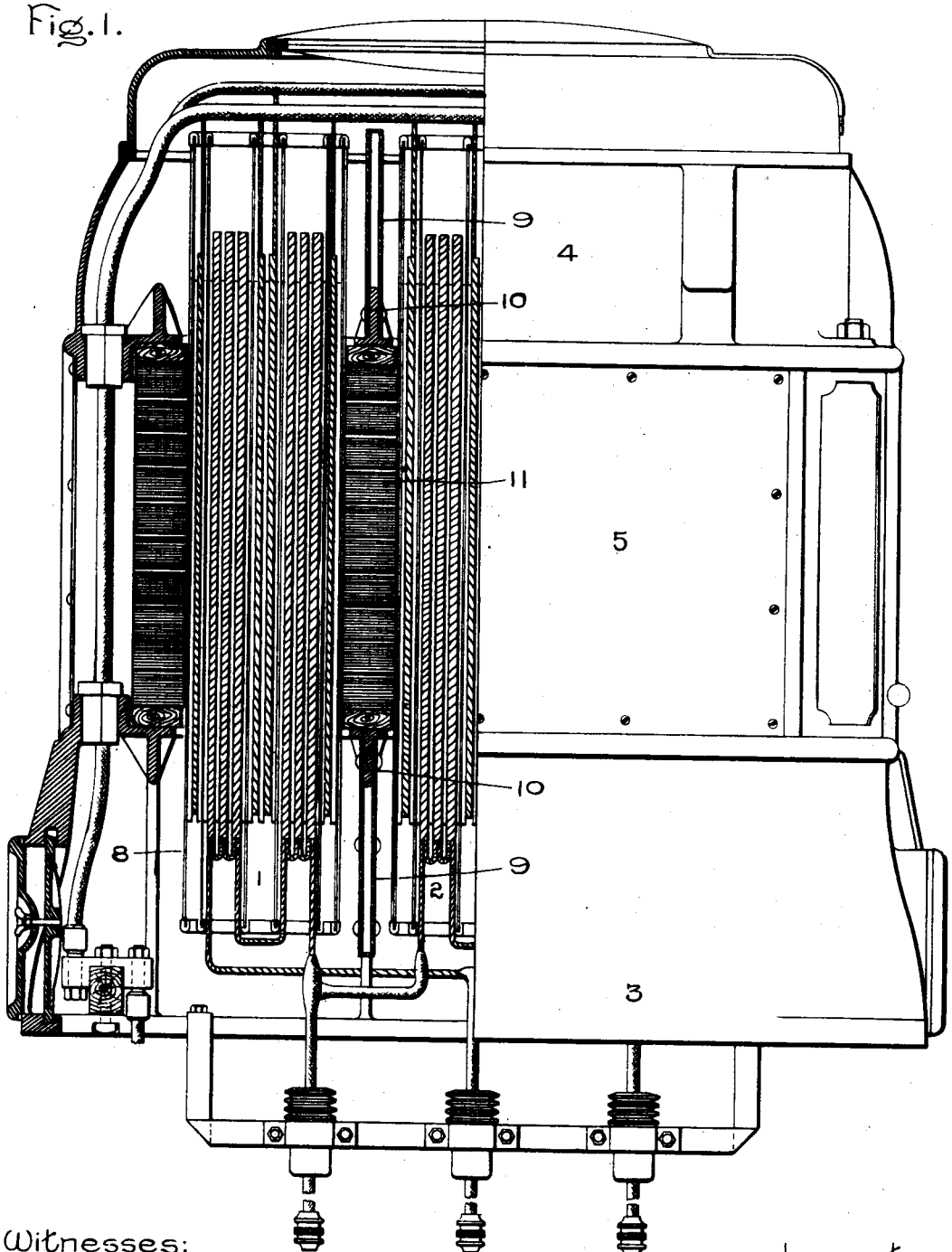
Figure 2:
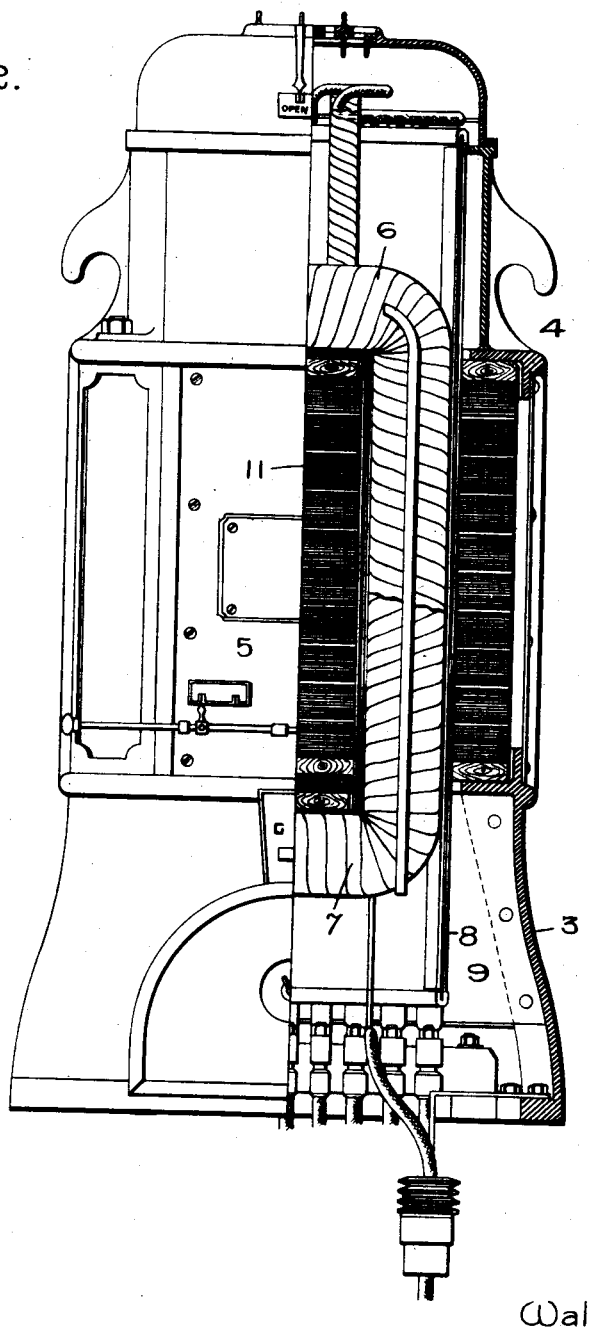

Figure 1 is a side elevation, partly in section, of a transformer embodying my invention; and Fig. 2, an end elevation, partly in section, of the same transformer.

The transformer illustrated in the drawings is of the three-phase air-blast type and is provided with three sets of windings, one for each phase. One set of windings for one of the phases is illustrated in section at 1, while a portion of another set of windings is illustrated in section at 2, the remaining portion being concealed by the outside casing of the transformer, consisting, as indicated, of a base-casting 3 and a cap-casting 4, between which the core of the transformer is clamped, and the intervening inclosing walls 5. The remaining winding of the transformer is entirely concealed from view, but its illustration is unnecessary to an understanding of the present invention. By an inspection of Fig. 2 it will be seen that the transformer-windings are entirely inclosed within the iron core, except the end portions, which project, respectively, above and below the core, as indicated at 6 and 7. These end portions are surrounded by a casing of insulating material, (indicated, for example, in section at 8,) which casing insulates the coils from the core. To secure a permanently-effectual barrier between the windings of the several phases, I make use, however, of barriers of non-combustible material. In the present instance these barriers are represented at 9 and are formed from sheet metal bent into U shape so as to inclose an air-space of poor heat conductivity, and the free ends of the sheet metal are clamped, bolted, or riveted to a ribbed member 10, forming a portion of each of the main castings of the transformer-casing. These ribbed members of the cap and base castings extend transversely across the castings and serve as clamping-faces, between which the core, such as at 11, is compressed. Instead of separately fashioning the barriers from sheet metal and attaching them to the main castings of the transformer-casing the flanged members of these castings may be made of such dimensions as to separate the exposed ends of the windings of the several phases of the transformer.

What I claim as new, and desire to secure by Letters Patent of the United States, is—

1. In a transformer, the combination of a plurality of sets of coils, magnetic material surrounding the active portions of the windings of each set of coils, and barriers of incombustible material interposed between the exposed ends of adjacent sets of coils.

2. In a transformer, the combination of a magnetic core, coils mounted thereon so as to be separated from each other by magnetic material, and barriers of incombustible material interposed between the exposed portions of said coils.

3. In a multiphase transformer, the combination of windings for the several phases, and metallic barriers interposed between exposed portions of adjacent windings.

4. In a multiphase transformer, the combination of a magnetic core, windings for the several phases, and sheet-metal barriers between exposed portions of adjacent windings.

In witness whereof I have hereunto set my hand this 25th day of March, 1902.

WALTER S. MOODY.

Witnesses:
BENJAMIN B. HULL,
HELEN ORFORD.